S. E. SMITH.
DENTAL MANDREL.
APPLICATION FILED MAR. 26, 1914.
1,133,409.
Patented Mar. 30, 1915.
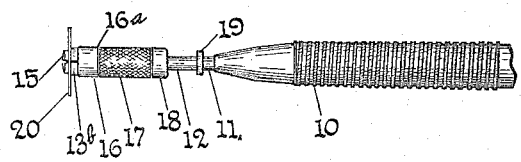
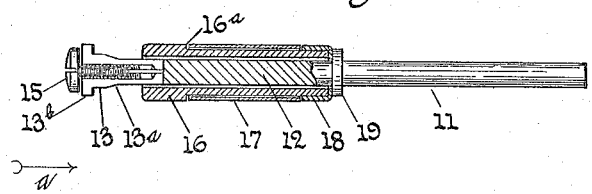
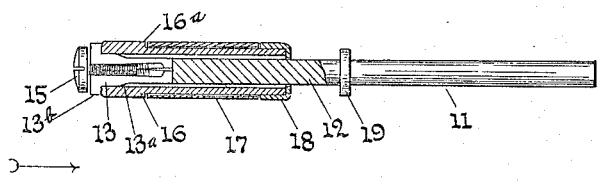
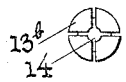
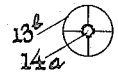
Witnesses:—
E. R. Llewellyn
L. G. Llewellyn
Inventor
Silas E. Smith

UNITED STATES PATENT OFFICE.

SILAS E. SMITH, OF WORCESTER, MASSACHUSETTS.

DENTAL MANDREL.

1,133,409.

Specification of Letters Patent.

Patented Mar. 30, 1915.

Application filed March 26, 1914. Serial No. 827,314.

*To all whom it may concern:*

Be it known that I, SILAS E. SMITH, a citizen of the United States, residing at Worcester, in the county of Worcester and State of Massachusetts, have invented a new and useful Dental Mandrel, of which the following is a specification.

This invention relates to dental mandrels and more particularly to an expansible and contractible head formed thereon.

It often becomes necessary to change the disks used in connection with a dental mandrel, in so doing the operator is required to either stop or reverse the engine, thereby releasing the screw or pin securing the disk to the mandrel; this operation requires time and a certain amount of strain on the mechanism when the engine is so reversed.

The object of my invention is to provide a mandrel whereby the screw securing the disk may be changed without stopping or reversing the engine.

My invention consists in certain devices, arrangements and combinations of parts which will be hereinafter described and more specifically pointed out in the appended claim.

A preferred form of my invention is shown in the accompanying drawing in which,

Figure 1 is a view of my improvement combined with a portion of a dental engine handpiece. Fig. 2 is, on an enlarged scale, a side view of a mandrel, my improvement combined therewith is shown in section. Fig. 3, is a view corresponding to Fig. 2, but shows some of the parts in a different position. Fig. 4, is an end view of Fig. 2, viewing in direction of arrow $a$, same figure and, Fig. 5 is an end view of Fig. 3, viewing in direction of arrow $b$, same figure.

In the accompanying drawing 10 is a portion of a dental engine handpiece into which the shank 11 of the mandrel 12 is inserted in the usual and well known way.

13 is the mandrel head formed of greater diameter than the mandrel shank 11 and tapering at 13$^a$ to the diameter of said shank 11.

A preferred method of forming my improved head is, the head is first drilled at 14 with a drill equal or of greater diameter than the outside diameter of the screw threads, the head is then slotted transversely, as shown at Fig. 4, after this operation the head 13 is contracted, as shown at Fig. 5 and tapped 14$^a$ equal in diameter to the screw 15. It will readily be seen by this construction that when the head 13 is allowed to expand to its normal position, the screw 15 may be readily withdrawn.

16 is a contracting or clamping sleeve loosely mounted on the mandrel 12, the sleeve 16 is provided with an outer knurled sleeve 17, said outer sleeve 17 is loosely mounted on the clamping sleeve 16 and held in position by the shoulder 16$^a$ and a stop 18 secured to said clamping sleeve 16.

19 is a collar or stop secured to the mandrel 12 after the clamping sleeve 16 is in place.

I will now describe the operation of my mandrel, the knurled sleeve 17 being loosely mounted on the clamping sleeve 16 the operator may grasp said sleeve 17 without interfering with the rotation of the mandrel 12, the clamping sleeve 16 is then moved, by means of the outer sleeve 17 forward to the flange or stop 13$^b$ which by means of the inclined shoulder 13$^a$ will cause the head 13 to be contracted, thereby reducing the tapped hole 14$^a$ to the correct diameter of the screw 15, see Fig. 3, said screw is first inserted through the disk 20 in the usual and well known way after which it is started into said tapped hole 14$^a$, the operator holding said screw 15 until the rotation of the mandrel has carried said screw 15 to the desired position.

To release the screw 15 the operator grasps the knurled sleeve 17 forcing the clamping sleeve 16 rearward against the stop 19, thereby releasing and allowing the head 13 to expand to its normal position, see Fig. 2, in which position the screw may be readily withdrawn without interfering with the tapped hole.

I am aware that heretofore dental mandrels have been made with an expansible head formed thereon, also the method of securing the disk to the mandrel with a screw inserted in a threaded bore, and I do not broadly claim such methods, but What I do claim is:—

In an expansible and contractible mandrel head, the combination of a contracting sleeve, mounted on said head, an outer sleeve loosely mounted on said contracting sleeve, said outer sleeve being rotatable independently of said contracting sleeve, substantially as shown and described.

In testimony whereof I have hereunto set my hand, in the presence of two subscribing witnesses.

SILAS E. SMITH.

Witnesses:
E. R. LLEWELLYN,
L. G. LLEWELLYN.

Copies of this patent may be obtained for five cents each, by addressing the "Commissioner of Patents, Washington, D. C."